UNITED STATES PATENT OFFICE.

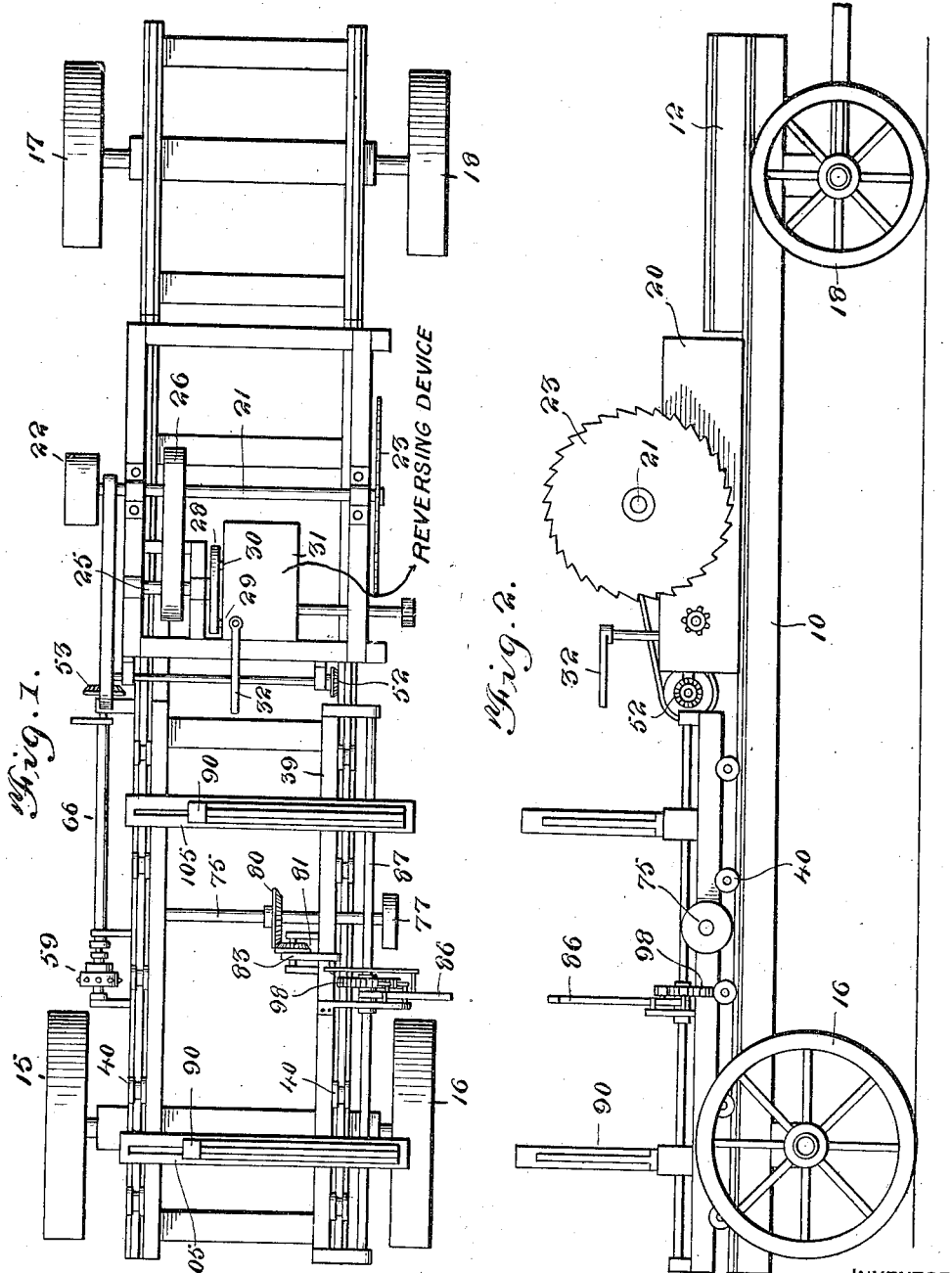

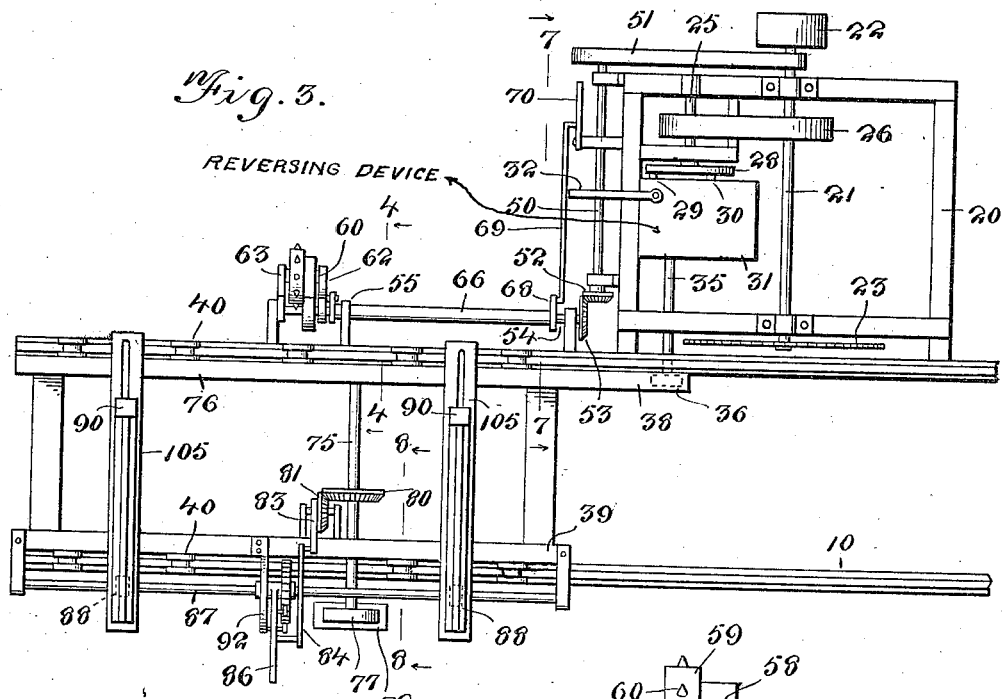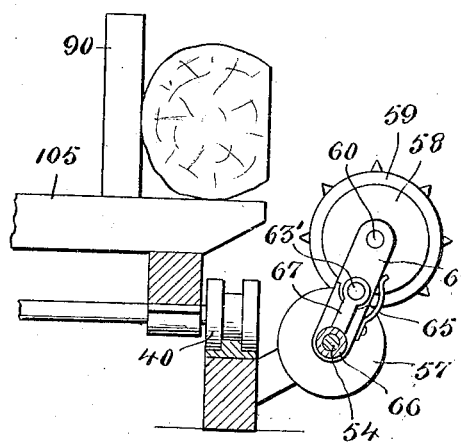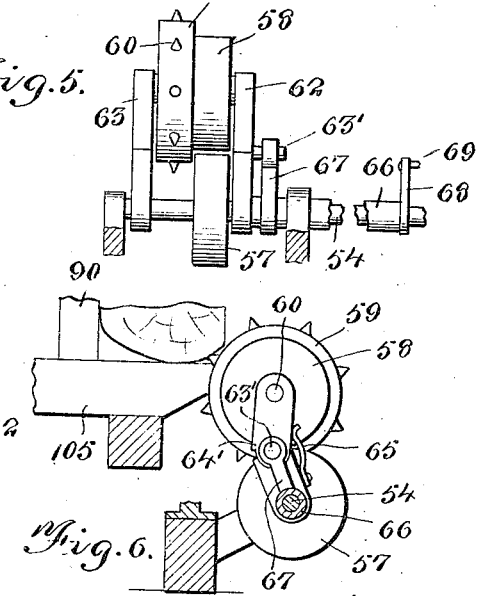

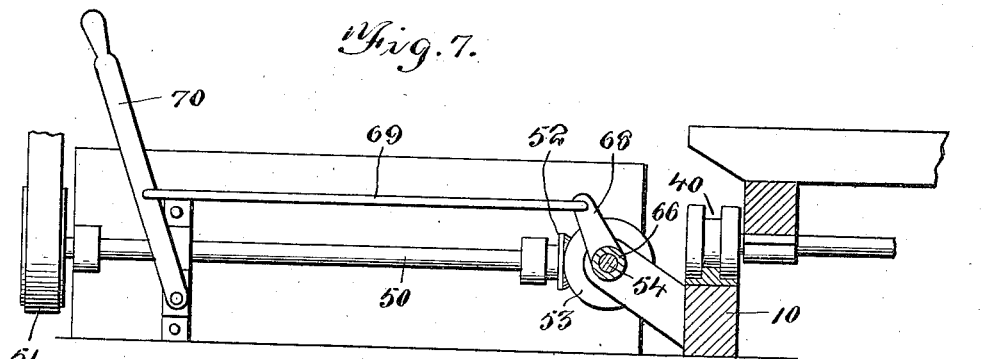
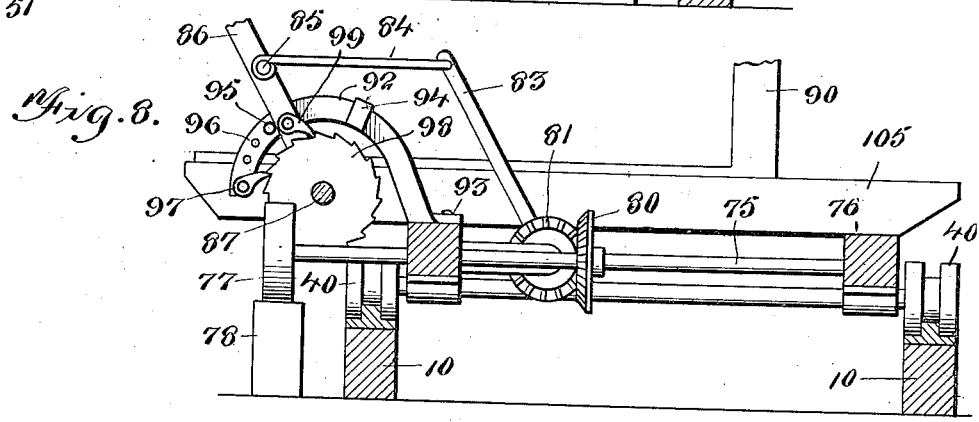
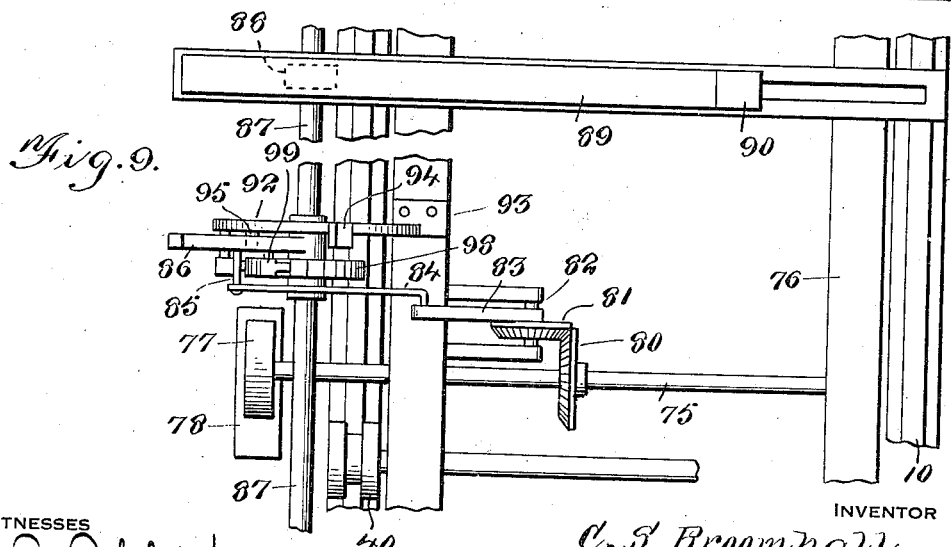

CLARENCE S. BROOMHALL, OF SPENCER STATION, OHIO.

PORTABLE SAWMILL.

1,320,197.  Specification of Letters Patent.  Patented Oct. 28, 1919.

Application filed March 17, 1917. Serial No. 155,550.

*To all whom it may concern:*

Be it known that I, CLARENCE S. BROOMHALL, a citizen of the United States, residing at Spencer Station, in the county of Guernsey and State of Ohio, have invented new and useful Improvements in Portable Sawmills, of which the following is a specification.

This invention relates to portable saw mills and one of the objects is to provide power operated means of certain novel construction, for turning the log.

In the accompanying drawings, forming part of this application:—

Figure 1 is a top plan view showing the detachable portion of the frame mounted on the main track for transportation.

Fig. 2 is a side elevation showing the mechanism under similar conditions.

Fig. 3 is a top plan view showing the apparatus in position for use.

Fig. 4 is a detail partly in section on line 4—4 of Fig. 3.

Fig. 5 is a detail in elevation of the log turning mechanism shown in Fig. 4.

Fig. 6 is a further detail showing the turning device in position for engaging a log.

Fig. 7 is taken on line 7—7 of Fig. 3.

Fig. 8 is taken on line 8—8 of Fig. 3.

Fig. 9 is a top plan view of the structure of Fig. 8.

The framework of the main track is designated 10, and a detachable portion thereof shown more particularly in Fig. 2, is designated 12, this detachable portion being capable of being carried on the main portion 10 when the apparatus is being transported from place to place. For the purpose of transportation the entire apparatus is mounted on trucks including wheels 15, 16, 17 and 18.

A boxlike structure or frame 20 supports the driving mechanism and is normally positioned at the side of the main track but is carried in the position shown in Fig. 2 during transportation. The main drive shaft is designated 21 and carries a pulley 22 connected with any suitable source of power, shaft 21 also carrying a saw 23. Shaft 21 drives the shaft 25 by means of a belt 26 and carried on shaft 25 is a disk 28 forming a part of the changeable speed mechanism of well known construction. The small friction wheels 29 and 30 engaging this disk are illustrated and the reversing mechanism of usual construction is designated diagrammatically and is inclosed in a framework shown at 31. An operating device for the reversing mechanism appears at 32. The structure last described forms no part of the present invention.

The shaft 35 connected with the reversing mechanism carries a wheel 36 on the extreme end thereof for engaging the underside of the frame of the carriage. A portion of this frame is shown at 38 and the opposite side of the frame at 39, wheels 40 being mounted on members 38 and 39 and bearing on the main track.

The improved mechanism for turning the log will now be described. The shaft 50 is driven by means of a belt 51 which in turn is driven from shaft 21, suitable pulleys being provided. On the end of shaft 50 is a beveled gear 52 meshing with a gear 53 carried on shaft 54 mounted in the bearings at the sides of the main frame, one of these bearings being designated 55. Shaft 54 carries a pulley 57 shown in Figs. 4, 5 and 6, this shaft driving said pulley and at times driving a pulley 58 with which is rigidly connected a spiked wheel 59. These pulleys 57 and 58 are shown in Fig. 5 as being spaced a slight distance from each other and this is their normal position. The short shaft 60 carrying pulley 58 and sprocket wheel 59 is mounted in arms 62 and 63 carried on shaft 54. These arms are formed of a plurality of members pivotally connected as shown in Figs. 4, 5 and 6 and a spring 65 mounted on one of the members of each arm bears against the complementary member of said arm for the purpose of normally holding the sections of the arm in the position indicated in Fig. 4. The members of each arm 62 and 63 are pivotally connected by means of a pin 63', this pin projecting laterally and passing through an eye formed in arm 67 mentioned below. The hinged joint at this point permits of the movement of the two members of each arm 62 and 63 in one direction as indicated in Fig. 6, and the abutting portions 64' prevent movement in the opposite direction to a greater extent than that indicated in Fig. 4 in which the arm appears with its two parts in exact alinement.

Shaft 54 has eccentric therewith a sleeve 66 carrying at one end an arm 67 and at the opposite end an arm 68 pivoted to a connecting rod 69 which is under the control of lever 70. The operation of the lever last mentioned therefore causes a partial rotation of sleeve 66 and the operation of said arm 67 for the purpose of producing the relative movement of the parts of each arm 62 and 63 indicated in Fig. 6, thereby throwing the spiked wheel 59 into engagement with the log and at the same time throwing pulley 58 into engagement with pulley 57. The engagement of the log by means of the rotating spiked wheel effects the partial rotation of the log. Arms 62 and 63, each comprising a pair of pivotally connected elements as specified, operate on the toggle joint principle.

The automatic feed for the carriage is shown in detail in Figs. 8 and 9 and includes a main shaft 75 mounted transversely of the carriage which as a whole is designated 76. One end of the shaft 75 projects laterally and carries a pulley 77 which is engaged at a given point during the travel of the carriage by coming into contact with horizontal stationary member 78. Shaft 75 carries a gear wheel 80 which meshes with gear wheel 81 on a short shaft 82. A lever 83 mounted on shaft 82 is pivoted at its upper end to connecting rod 84 and the latter is in turn pivoted at 85 to lever 86. The lever last mentioned is mounted on a longitudinal shaft 87 carrying wheels, one of which is shown at 88, for effecting the lateral movement of lower bar 89 carrying at its end the knee 90.

The lever 86 coöperates with a quadrant-shaped member 92 mounted at 93, carrying a stop member 94 and also carrying an adjustable stop 95 adapted to enter any of the openings 96 in member 92. A pawl 97 is pivoted at the left hand end of the member 92 as the parts appear in Fig. 8, and engages the teeth of wheel 98 mounted on shaft 87. A second pawl 99 is mounted on lever 86 and also engages the teeth of the wheel 98.

It will be understood that the automatic feed is operated when the carriage reaches a suitable position, and it is desired to advance the log for another cut. At this time wheel or pulley 77 engages the stationary member 78 producing the rotation of shaft 75, gears 80, 81 and shaft 82, causing the lever 83 to move a given distance and imparting a similar movement through connecting rod 84 to lever 86. The lever last mentioned effects the rotation of shaft 87 and of wheels such as 88, carried thereby, causing the movement of head blocks 90 through a suitable distance corresponding to the thickness of the board to be cut.

The usual head blocks beneath the knees 90 are shown at 105.

What is claimed is:—

1. In a device of the class described, means for supporting a log, a saw, means for driving the saw, and log turning mechanism operated from said driving means and comprising a shaft, a plurality of rotating members, one of which is carried by the shaft, the other being normally spaced from the rotary member first mentioned, a log engaging device driven from said second rotary member, and means for causing the rotary members to engage one another and simultaneously throw the log engaging device into operative position, said means last named constituting a toggle joint structure the elements of which are non-collapsible in one direction.

2. In a device of the class described, a frame including a track, a saw mounted on the frame, and means for driving the saw, a carriage movable on the track, and means for changing the position of a log supported by the carriage, said means including a rotary frictional member, driving means therefor operated continuously from the driving means first mentioned, a second frictional member normally spaced from the first, log engaging means connected with said second member and means for throwing the frictional members into engagement, said means last named comprising a plurality of pivotally connected elements operating as a toggle joint.

3. In a device of the class described, a frame including a track, a saw mounted on the frame, means for driving the saw, a carriage movable on the track, and means for changing the position of a log supported by the carriage, said means including a rotary frictional member, and driving means therefor operated continuously from the driving means first mentioned, a second frictional member normally spaced from the first, log engaging means connected with said second member, an arm controlling the spaced relationship of the frictional members, and comprising a plurality of pivoted link members, an arm connected with the pivotal portion of the members last mentioned, for operating the link members as a toggle joint, and means for operating the last-named arm.

4. In a device of the class described, a frame including a track, a saw and driving means therefor, a carriage, means for partly rotating a log supported by the carriage and including a shaft connected with the driving means first-mentioned and continuously operated thereby, a sleeve concentric with the shaft, means for manually rotating the sleeve, a second frictional member normally spaced from the first, a rotary log engaging member connected with the second frictional member, and means including a jointed spring-pressed arm connected with the shaft, and operated at times by the sleeve for producing engagement between the frictional members.

In testimony whereof I affix my signature.

CLARENCE S. BROOMHALL.